Sept. 20, 1966     L. N. SHUFORD ETAL     3,273,708

OBJECT SEPARATING APPARATUS

Filed Dec. 29, 1964     2 Sheets—Sheet 1

INVENTORS
LLOYD N. SHUFORD
CARROLL B. MESSER III
BY
*James and Franklin*
ATTORNEYS Sept. 20, 1966  L. N. SHUFORD ETAL  3,273,708
OBJECT SEPARATING APPARATUS
Filed Dec. 29, 1964  2 Sheets-Sheet 2

INVENTORS
LLOYD N. SHUFORD
CARROLL B. MESSER III
BY
ATTORNEYS

United States Patent Office 3,273,708
Patented Sept. 20, 1966

3,273,708
OBJECT SEPARATING APPARATUS
Lloyd N. Shuford and Carroll B. Messer III, Lynchburg, Va., assignors to Simplimatic Engineering Co., Lynchburg, Va.
Filed Dec. 29, 1964, Ser. No. 421,974
22 Claims. (Cl. 209—74)

The present invention relates to apparatus for separating selected bodies from a line of bodies being fed along. It is particularly well adapted for use in conjunction with automatic sensing devices which detect the presence in the line of bodies of a predetermined character and automatically cause their ejection from the line. It is also useable in connection with other types of control, such as manual control or pre-programmed control.

There are many instances where different types of bodies are grouped together and selection must be made as between bodies of one type and another, with the bodies being segregated according to their respective types. The word "type" is here used quite broadly, and encompasses within its scope such differences as size, shape, composition, contents, and the like. One particular such application arises in the beverage bottling industry, and the present invention will be described in that connection. It will be understood, however, that this is by way of exemplification only, and that the applicability of the invention is not limited thereto. In the bottling industry empty bottles are returned to the plant for reuse. Bottles are usually returned to the plant in cases, and typically sixteen-ounce bottles are returned in the same case with twelve-ounce bottles. Since in the plant the conveyor, processing and packing equipment is normally set to handle only one bottle size at a given time, the different sizes of bottles must be sorted, with bottles of each size grouped together, before they can be reprocessed.

It is the prime object of the present invention to devise an apparatus for separating bottles or other objects of different sizes or characteristics from one another when those bottles or other objects are indiscriminately mixed in a conveyed line of objects, and to do this by means of apparatus which is simple, dependable and inexpensive, which takes up little floor space, which has but a minimal power consumption, and which requires little or no supervision.

Through the use of apparatus of the present invention a bottler may receive bottles of different sizes and place them indiscriminately into a conveyed bottle line, the apparatus of the present invention functioning, automatically or otherwise, to divide that line into a pair of outlet lines, each of the outlet lines containing bottles of different characteristics.

This result is achieved, in accordance with the present invention, by causing the inlet line of indiscriminately mixed bottles to be pressure-fed to a separating station from which there is a primary outlet and a separation outlet. The arrangement is such that normally the line is fed only to the primary outlet. The actual separating station is located in advance of the primary outlet, and when a bottle which should be separated from the line is in that separating station, the apparatus is actuated to cause the bottle to be separated to move out from the line through the separation outlet. This is done by interrupting or impeding the line flow at a point in advance of the separating station and by so locating the bottle in the separating station relative to the bottles immediately in advance of it and immediately behind it that the pressure-feeding action on the bottle in the separating station cams or forces the latter out of the line and through the separation outlet, from which it may be conveyed in any appropriate manner. This forcing-out or camming effect is achieved by causing the bottle to be separated to be so located in the separating station that when an imaginary line is drawn through the effective horizontal centers of the bottles immediately in advance of and behind the bottle to be separated, that line falls on the opposite side of the effective horizontal center of the bottle to be separated from the separation outlet.

In the preferred form here specifically disclosed, the separation outlet is normally closed and the primary outlet is normally open. When a bottle to be separated from the line is located in the separation station, as sensed either visually or automatically, the separation outlet is opened and the primary outlet is closed. Means are preferably provided to bias bottles in the separation station toward the separation outlet, and that biasing means can also effectively function as an automatic sensing means to sense the character of the bottle in the separating station when the bottles differ from one another in diameter or thickness. Best results have been obtained when the line per se comprises first, second and third lengths in sequential communication with one another, the second length including the separating station and being angularly related to the first and second lengths, the second and angularly related lengths being directed toward the primary and separation outlets respectively. With this arrangement the location of the bottles to produce the desired camming-out result is greatly facilitated, and the same installation can, through a very simple electrical modification, be adapted to separate large-size bottles from a line consisting primarily of small-size bottles or vice versa.

While the apparatus disclosed is capable of dividing a single inlet line into two outlet lines, it will be apparent that segregation of bottles or other objects into three or more groupings can be accomplished by repetitive subjection of lines containing bottles of different types to apparatus of the type here disclosed.

To the accomplishment of the above, and to such other objects as may hereinafter appear, the present invention relates to separating apparatus as defined in the appended claims and as described in this specification, taken together with the accompanying drawings, in which:

The apparatus of the present invention will, as above indicated, be specifically described in connection with the separation of an inlet line of bottles of two different sizes into outlet lines each containing bottles of the same size. It will be understood, however, that bottles are here used for exemplification purposes only, and that the invention could be used to segregate many other different types of objects, and particularly objects such as cylinders and spheres having essentially circular horizontal cross sections.

Figure 1:
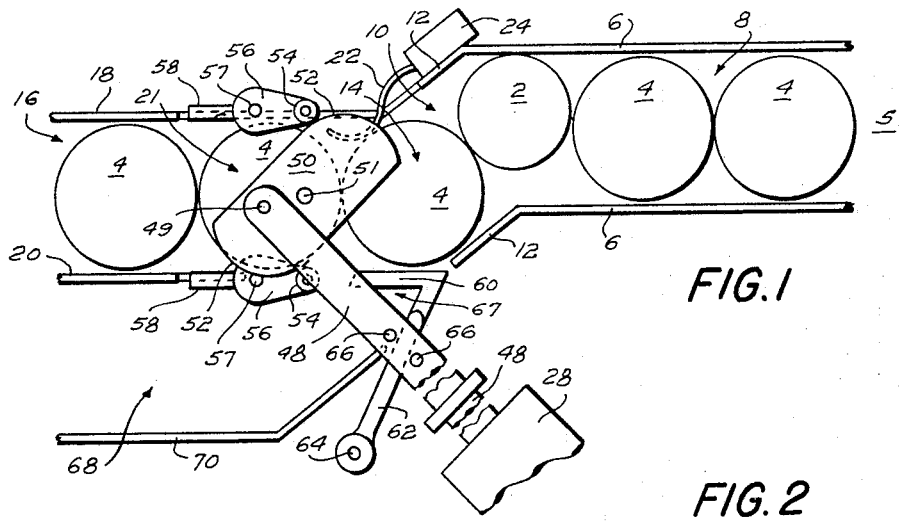
FIG. 1 is a diagrammatic view of a preferred embodiment of the present invention as used for the separation of bottles of small diameter from a line consisting primarily of bottles of large diameter, the apparatus being shown in the condition which it assumes when a bottle of large diameter is in the separating station.
Figure 2:
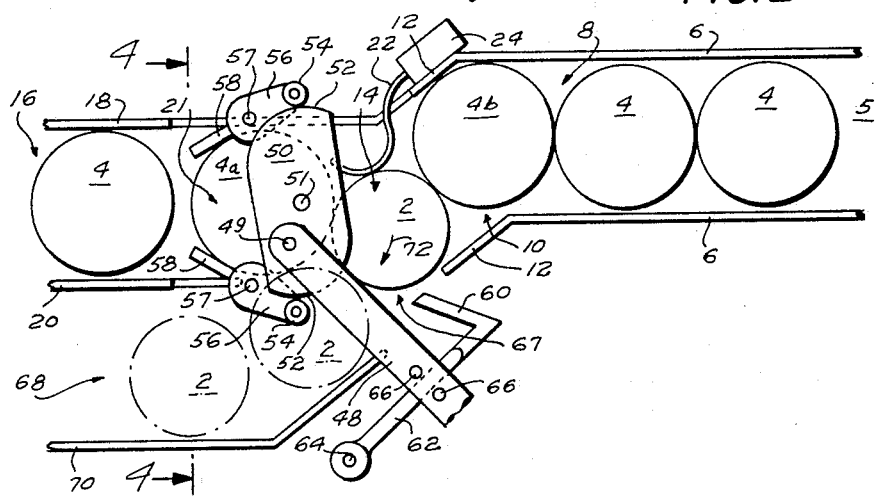
FIG. 2 is a view similar to FIG. 1 but showing the apparatus in the condition which it assumes when a bottle of small diameter is in the separating station and is being separated from the line.

Having reference first to FIGS. 1 and 2, the apparatus is disclosed for separating small bottles 2 from a line consisting also of large bottles 4. The line of bottles 2, 4 is fed from an inlet station 5 in any appropriate manner between the guides 6, which are spaced from one another sufficiently to permit the free passage of the large size bottles 4 therebetween. Any appropriate means, such as a bottle-supporting conveyor belt, is provided for feeding the inlet line of the bottles 2 and 4 in pressure-fed condition along the length 8 of the feeding and guiding means comprising the guides 6, that length 8 communicating with a length 10 comprising the space between guides 12, the length 10 making an obtuse angle with the length 8. The separating station 14 forms a part of the length 10. The length 10 communicates with a length 16, defined between the guides 18 and 20, which makes an obtuse angle with the length 10 and which extends in the same general direction as the length 8. The beginning of the length 10 defines a normal outlet 21 from the separating station 14. One side of the length 10, opposite the separating station 14, is defined by a movable feeler arm 22 spring urged laterally into the length 10 so as to normally assume its position shown in FIG. 2 but movable outwardly to its position shown in FIG. 1.

Figure 6:
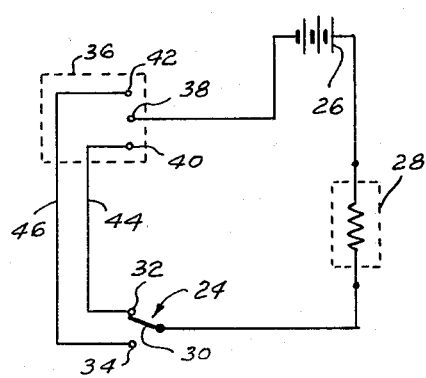
FIG. 6 is a circuit diagram of the electrical portion of the apparatus specifically disclosed.

The arm 22 is adapted to actuate a switch 24 which is electrically connected between a source of electrical energy 26 and an electromagnet 28 (see FIG. 6). When the arm 22 is in its position shown in FIG. 1 movable contact 30 engages and makes electrical connection with fixed contact 32. When the arm 22 is in its position shown in FIG. 2 movable contact 30 moves away from fixed contact 32 and engages and makes electrical connection with fixed contact 34. Single-pole double-throw switch 36 has inlet contact 38 and outlet contacts 40 and 42, the outlet contacts 40 and 42 being connected by leads 44 and 46 respectively to the fixed contacts 32 and 34 respectively of the switch 24.

The electromagnet 28, when electrically energized, causes retraction of its armature 48. That armature is connected at 49 to cam 50, which is pivotally mounted at 51 and has cam surfaces 52 engaged by rollers 54 at the ends of arms 56, the latter being pivotally mounted at 57 and having gate elements 58 extending out therefrom, the gate elements 58 being located at the normal outlet 21 from the separating station 14. When the armature 48 is in its extended position as shown in FIG. 1, which it will be when the electromagnet 28 is not energized, the gate elements 58 are in line with the guides 18 and 20 and thus permit the free passage of bottles 4 through the normal outlet from the separating station 14 to the length 16 of the line. When, however, the electromagnet 28 is energized and the armature 48 is retracted, as shown in FIG. 2, rotation of the cam 50 causes pivoting of the arms 56 so as to move the gate elements 58 toward one another, as shown in FIG. 2, the gate elements 58 then closing said normal outlet 21 and blocking passage of a bottle 4 from the length 10 of the line to the length 16 of the line.

Another gate element 60 is located at the end of the guide 12 and opposite the arm 22 and is carried by arm 62 pivotally mounted at 64. The arm 62 is operatively connected in any appropriate manner, as by means of the depending pins 66, to the electromagnet armature 48. When the electromagnet 28 is de-energized and its armature 48 is therefore projected, the arm 62 will be so positioned thereby that the gate element 60 will be located opposite the separating station 14, thereby blocking the separation outlet 67 leading to an exit line length 68 defined between the guides 20 and 70, thus preventing the passage of bottles to the exit line 68. When the electromagnet 28 is energized and its armature 48 is retracted, as shown in FIG. 2, the arm 62 will be caused to pivot in a clockwise direction and gate element 60 will be withdrawn to a position outside the guides 12 and 70, thereby opening the separation outlet 67, providing access to the exit line 68 and permitting bottles to move thereinto.

The functioning of the apparatus in the embodiments of FIGS. 1 and 2 to separate small diameter bottles 2 from large diameter bottles 4 is as follows: The switch 36 is set to connect contacts 38 and 42, thus making fixed contact 34 of switch 24 live and fixed contact 32 dead. The line of bottles in the inlet length 8 is pressure-fed along that length in any appropriate fashion and the leading bottle of the line enters the separating station 14. If that leading bottle is a large size bottle 4 it will force the arm 22 outwardly to its position shown in FIG. 1, the movable contact 30 of the switch 24 will engage the dead fixed contact 32 thereof, the electromagnet 28 will be de-energized, and the gate elements 58 and 60 will assume the position shown in FIG. 1. Thus the leading bottle 4 will pass between the spread-apart gate elements 58 and through the normal outlet 21 into the outlet length 16. As long as large size bottles 4 continue to arrive at the separating station 14 the apparatus will remain in its condition shown in FIG. 1, and there will be a steady pressure-feeding of large size bottles 4 to the outlet length 16.

When, however, a small size bottle 2 enters the separating station 14 the spring-urged arm 22 will move to its inner position shown in FIG. 2, this being permitted by the smaller diameter of the bottle 2, and the bottle 2 will be pressed thereby toward the gate element 60. (The arm 22, during the time that large size bottles 4 were in the separating station 14, was also pressing those bottles 4 toward the gate element 60, but this did not alter the delivery of the bottles 4 to the outlet length 16 because the gate element 60 was closing the separation outlet 67 and blocking access to the outlet length 68.) When the arm 22 moves to its inner position shown in FIG. 2 the movable contact 30 of the switch 34 moves into engagement with the live fixed contact 34, the electromagnet 28 is energized, its armature 48 is retracted, and the gate elements 58 and 60 assume their position shown in FIG. 2. The gate elements 58 engage and stop movement of the large size bottle 4a which is located in advance, in the line, of the small size bottle 2. The large size bottle 4b in the line immediately behind the small bottle 2 is still being pushed forwardly by virtue of the pressure-fed nature of the inlet line of bottles. As may clearly be seen from FIG. 2, this will result in a camming or forcing of the small bottle 2 outwardly from the line, in the direction of the arrow 72, and since the gate element 60 has been withdrawn from its blocking position, the small size bottle 2 is pushed through the separation outlet 67 into the outlet length 68.

If the next succeeding bottle in the line is a small bottle 2, the condition of the gate elements 58 and 60 will again be as shown in FIG. 2 and that small bottle will be forced out from the separating station 14 into the outlet length 68. If, as is shown in the drawings, the next bottle in line is a large size bottle 4 it will, when it reaches the separating station 14, move the arm 22 back to its position shown in FIG. 1, the gate elements 58 will open, the gate element 60 will close, and large size bottles 4 will continue to be fed to the outlet length 16.

It will be observed from an examination of FIG. 2 that when the small bottle 2 is in the separating station 14 its effective horizontal center lies between the separation outlet 67 (the normally closed position of the gate element 60) and a line drawn between the effective horizontal centers of the bottles 4a and 4b which immediately precede and immediately follow it in the line. Preferably this is the case even if the immediately following bottle is of a small size and is located at the lower end of the inlet line 8 as viewed in FIG. 2. This relationship makes for most effective camming of the small bottle 2 out of the line of bottles and into the outlet length 68. As may be seen from FIG. 1, the same spatial relationship exists in the apparatus here specifically disclosed when a large bottle 4 is in the separating station 14, but the camming-out action is positively prevented by the blocking action of the gate element 60.

Figure 3:
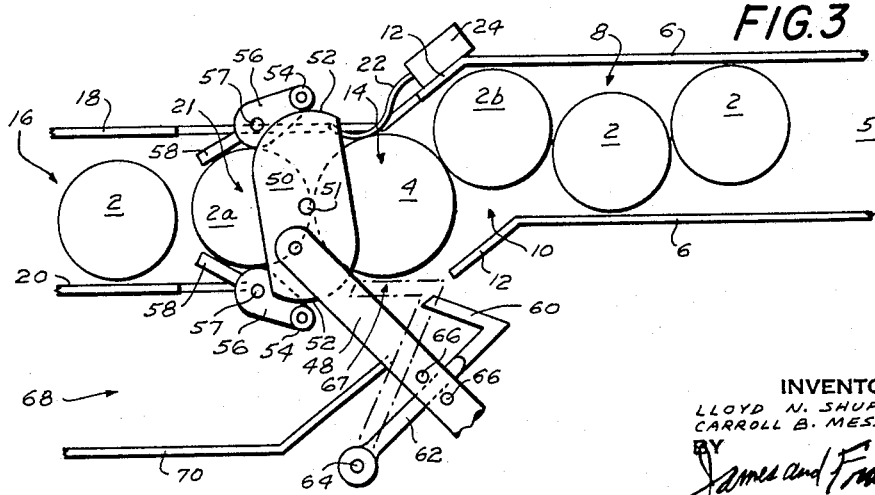
FIG. 3 is a view similar to FIG. 2, but showing the apparatus in use to separate bottles of large diameter from a line consisting primarily of bottles of small diameter.
Figure 4:
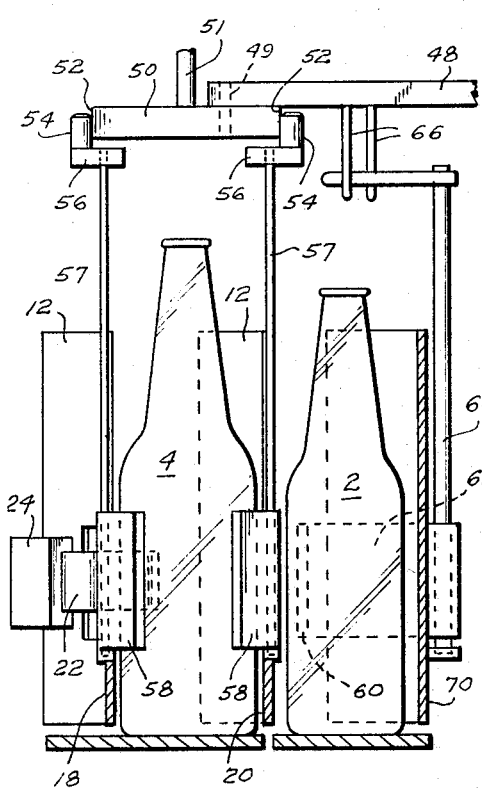
FIG. 4 is a view taken along the line 4—4 of FIG. 2.

If the line of bottles is composed primarily of small diameter bottles and it is desired to separate occasional large size bottles from the line, the same apparatus may be used, but with the switch 36 shifted so as to connect contacts 38 and 40, thus rendering contact 32 live and 34 dead. Under those circumstances the electromagnet 28 will be oppositely actuated relative to the position of the arm 22. It will be unenergized when the arm 22 is in its inner position and it will be energized when the arm 22 is in its outer position. The biasing action on the arm 22, tending to move it to its inner position, will be strong enough so that the arm 22 will remain in its inner position as long as small size bottles 2 are in the separating station 14. Since the gate element 60 will then be in blocking position and the gate elements 58 will be spread apart, the small size bottles will therefore be pressure-fed past the gate elements 58 and through the primary outlet 21 into the outlet line 16. However, when a large size bottle 4 enters the separating station 14 the arm 22 will be positively moved to its outer position, as shown in FIG. 3. This will cause the electromagnet 28 to become energized and hence, as described above, the gate elements 58 will close and the gate element 60 will open. As a result the large bottle 4 in the separating station 14 will be cammed outwardly through the separation outlet 67 into the outlet line 68 by being squeezed between the small size bottles 2a and 2b immediately preceding and following it in the line, the gate elements 58 preventing forward movement of, and properly positioning, the bottle 2a. Forward movement of the bottle 2b will continue because of the pressure-fed condition of the inlet line 8, and from this comes the force which urges the large bottle 4 into the outlet line 68.

Figure 5:
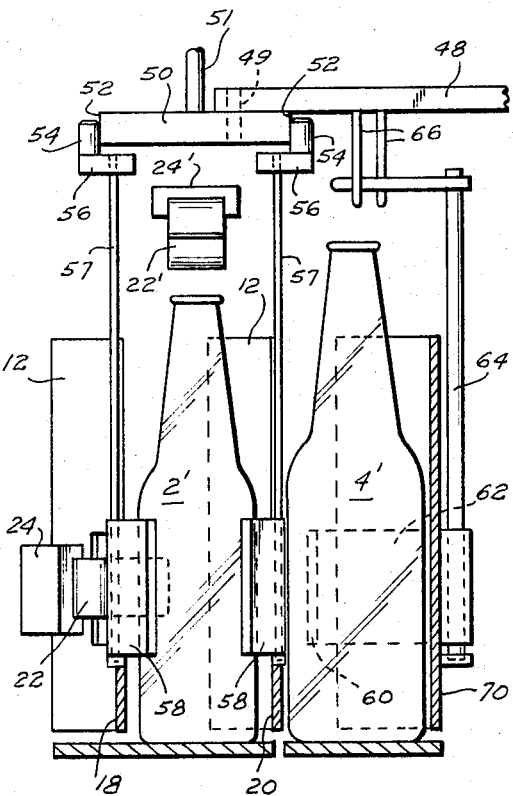
FIG. 5 is a view similar to FIG. 4 but showing the use of an automatic sensing means actuated by the height rather than the diameter of the bottles in the separating station.

In the embodiments of FIGS. 1–3 the arm 22 serves a dual function; it both biases the bottle 2 or 4 which is in the separating station 14 toward the gate element 60 and serves to sense the size of the bottle 2 in the separating station 14. The size which it senses, of course, is diameter or width. Size may also be sensed in terms of height, as shown in FIG. 5, where a switch 24' is mounted at an appropriate elevation at the separating station 14 and is provided with a depending spring urged feeler arm 22' which is adapted to be engaged by the upper ends of tall bottles 4' but not to be engaged by the upper ends of short bottles 2'. The switch 24' would be connected in the separating circuit of the apparatus in the same fashion as the switch 24 in the embodiment of FIGS. 1–3. The laterally spring-urged arm 22 would, in the height-sensing embodiment of FIG. 5, preferably still be employed, although solely as a biasing means and without necessarily performing any sensing functions. If desired, both arms 22 and 22' could be used for sensing in order, for example, to separate bottles which are either of small diameter or small height from the line.

It will be appreciated that the type of sensing means employed could be widely varied, depending upon the nature of the parameter to be sensed. Thus a weight-sensitive floor at the separating station 14 could be employed to discriminate between filled and empty containers, or between containers of different weights, photo-electric means could be utilized to sense size, shape or even color, electrical means could be utilized to discriminate between electrically conductive and electrically non-conductive objects. Indeed, if desired, sensing could be carried out visually by an operator who would manually close the switch 24 to energize the electromagnet 28 whenever an object appeared in the separating station 14 which in his judgment should be removed from the line. Appropriate time-delay mechanisms could be employed, either of the electrical or mechanical type, in order to provide for smoothness of operation and prevent the shifting of the gate elements 58 and 60 from one condition to another until a period of time appropriate to the entry of a new object into the separating station 14 had elapsed. Adjustment of such time delay means, and adjustment of the spring bias applied to the arms 22 and 22' to correspond to particular operating conditions, can be accomplished very readily in accordance with the known state of the art.

Although the invention has been here specifically disclosed in connection with a line of bottles, it will be apparent that it can be used in connection with many other types of articles, and particularly articles having a circular or essentially circular horizontal cross section, since the camming-out action of the pressure-fed line on the body to be separated will be most effective under those conditions.

While but a limited number of embodiments have been here specifically disclosed, it will be apparent that many variations may be made in the apparatus of the present invention without departing from the spirit thereof as defined in the following claims.

We claim:

1. Apparatus for separating bodies of a first type from bodies of a second type comprising an inlet station, a separating station communicating with said inlet station, and first and second outlets communicating with said separating station, means for pressure-feeding a line of said bodies from said inlet station through said separating station and normally to said second outlet, means for sensing the presence at said separating station of a body of said first type to be separated from said line, means actuated by said sensing means for inhibiting the movement of a given body in advance of said body to be separated and positioning said given body so that a line between the effective horizontal centers of the bodies in said line immediately in advance of and behind the body to be separated is spaced from the effective horizontal center of the body to be separated and is on the other side of said last mentioned center from said first outlet, whereby the pressure-feeding action of said line of bodies on said body to be separated cams the latter out of said line and toward said first outlet.

2. In the apparatus of claim 1, gate means normally closing said first outlet, said gate means being actuated by said sensing means to open said first outlet when the presence of said body of said first type is sensed thereby.

3. In the apparatus of claim 2, biasing means engageable with bodies at said separating station and urging them toward said first outlet.

4. The apparatus of claim 2, in which said feeding means comprises a first length, a second length including said separating station angularly related to said first length and directed toward one of said outlets, and a third length angularly related to said second length, extending in the same general direction as said first length, and directed toward the other of said outlets, said first, second and third lengths being in sequential communication with one another.

5. The apparatus of claim 2, in which said feeding means comprises a first length, a second length including said separating station angularly related to said first length and directed toward said first outlet, and a third length angularly related to said second length, extending in the same general direction as said first length, and directed toward said second outlet, said first, second and third lengths being in sequential communication with one another.

6. In the apparatus of claim 2, biasing means engageable with bodies at said separating station and urging them toward said first outlet, said feeding means comprising a first length, a second length including said separating station angularly related to said first length and directed toward one of said outlets, and a third length angularly related to said second length, extending in the same general direction as said first length, and directed toward the other of said outlets, said first, second and third lengths being in sequential communication with one another.

7. In the apparatus of claim 2, biasing means engageable with bodies at said separating station and urging them toward said first outlet, said feeding means comprising a first length, a second length including said separating station angularly related to said first length and directed toward said first outlet, and a third length angularly related to said second length, extending in the same general direction as said first length, and directed toward said second outlet, said first, second and third lengths being in sequential communication with one another.

8. Apparatus for separating bodies of a first type from bodies of a second type comprising an inlet station, a separating station communicating with said inlet station, and first and second outlets communicating with said separating station, means for pressure-feeding a line of said bodies from said inlet station through said separating station normally to said second outlet, means for sensing the presence at said separating station of a body of said first type to be separated from said line, means actuated by said sensing means for arresting the movement of a given body in advance of said body to be separated and positioning said given body so that a line between the effective horizontal centers of the bodies in said line immediately in advance of and behind the body to be separated is spaced from the effective horizontal center of the body to be separated and is on the other side of said last mentioned center from said first outlet, whereby the pressure-feeding action of said line of bodies on said body to be separated cams the latter out of said line and toward said first outlet.

9. In the apparatus of claim 8, gate means normally closing said first outlet, said gate means being actuated by said sensing means to open said first outlet when the presence of said body of said first type is sensed thereby.

10. In the apparatus of claim 9, biasing means engageable with bodies at said separating station and urging them toward said first outlet.

11. The apparatus of claim 9, in which said feeding means comprises a first length, a second length including said separating station angularly related to said first length and directed toward one of said outlets, and a third length angularly related to said second length, extending in the same general direction as said first length, and directed toward the other of said outlets, said first, second and third lengths being in sequential communication with one another.

12. Apparatus for separating bodies of a first type from bodies of a second type which comprises means for guiding a plurality of objects in a line in pressure-feed relationship, said guiding means comprising a first portion communicating with an angularly related portion defining a separating station, a first outlet from said separating station located so as to essentially constitute a prolongation of said angularly related portion, a second outlet from said separating station located so as to essentially constitute a prolongation of said first portion, a first normally closed gate means between said separating station and said first outlet, a second normally open gate means between said separating station and said second outlet, means for sensing the presence at said separating station of a body of said first type which is to be separated from said line, and an operative connection between said sensing means and said first and second gate means effective to open the former and close the latter when said first type of body is sensed, said second gate means being located beyond said separating station by a distance at least equal to the width of a body of said second type and being effective to engage a body in said line in advance of said body to be separated.

13. In the apparatus of claim 12, biasing means engageable with bodies at said separating station and urging them toward said first outlet.

14. The apparatus of claim 13, in which a single means engageable with bodies at said separating station functions both as said biasing means and as said sensing means.

15. The apparatus of claim 13, in which said second gate means, when closed and engaging a body in advance of the body to be separated, positions the engaged body so that a line between the effective horizontal centers of the bodies in said line immediately in advance of and behind the body to be separated is spaced from the effective horizontal center of the body to be separated and is on the other side of said last mentioned center from said first gate.

16. The apparatus of claim 12, in which said second gate means, when closed and engaging a body in advance of the body to be separated positions the engaged body so that a line between the effective horizontal centers of the bodies in said line immediately in advance of and behind the body to be separated is spaced from the effective horizontal center of the body to be separated and is on the other side of said last mentioned center from said first gate.

17. Apparatus for separating bodies from a line of bodies comprising an inlet station, a separating station communicating with said inlet station, and first and second outlets communicating with said separating station, means for pressure-feeding a line of bodies from said inlet station through said separating station and normally to said second outlet, actuatable means effective, when actuated, to inhibit the movement of a given body which is located in said line in advance of a body to be separated from said line when said body to be separated is located in said separating station, and positioning said given body so that a line between the effective horizontal centers of said given body and the body in said line behind the body to be separated is spaced from the effective horizontal center of the body to be separated and is on the other side of said last mentioned center from said first outlet, and means operatively connected to said actuatable means for actuating the latter, whereby the pressure-feeding action of said line of bodies on said body to be separated cams the latter out of said line and toward said first outlet when said actuatable means is actuated.

18. In the apparatus of claim 17, gate means normally closing said first outlet, said gate means being operatively connected to said actuating means so as to be actuated to open said first outlet when said actuatable means is actuated.

19. In the apparatus of claim 18, biasing means engageable with bodies at said separating station and urging them toward said first outlet.

20. Apparatus for separating bodies from a line of bodies which comprises means for guiding a plurality of objects in a line in pressure-feed relationship, said guiding means comprising a first portion communicating with an angularly related portion defining a separating station, a first outlet from said separating station located so as to essentially constitute a prolongation of said angularly related portion, a second outlet from said separating station located so as to essentially constitute prolongation of said first portion, a first normally closed gate means between said separating station and said first outlet, a second normally open gate means between said separating station and said second outlet, and actuating means operatively connected to said gate means and effective, when actuated, to open said first gate means and close said second gate means, said second gate means being operatively located beyond said separating station by a distance at least equal to the width of a body in said line and being effective to engage, when closed, a body in said line in advance of the body then in said separating station.

21. In the apparatus of claim 20, biasing means engageable with bodies at said separating station and urging them toward said first outlet.

22. The apparatus of claim 20, in which said second gate means, when closed, is effective to position a given body immediately in advance of the body in said separating station so that a line between the effective horizontal centers of said given body and the body in said line immediately behind the body in said separating station is spaced from the effective horizontal center of the body in said separating station and is on the other side of said last mentioned center from said first gate means.

References Cited by the Examiner
UNITED STATES PATENTS

| | | | |
|---|---|---|---|
| 2,896,784 | 7/1959 | Greenamyer | 209—82 |
| 3,101,848 | 8/1963 | Uhlig | 209—111.7 X |
| 3,117,669 | 1/1964 | Schwarz | 209—80 |

M. HENSON WOOD, JR., *Primary Examiner.*

J. ERLICH, *Assistant Examiner.*